United States Patent
Fan et al.

(10) Patent No.: US 6,408,005 B1
(45) Date of Patent: Jun. 18, 2002

(54) DYNAMIC RATE CONTROL SCHEDULER FOR ATM NETWORKS

(75) Inventors: Ruixue Fan, Plainsboro; Brian L. Mark, Princeton; Gopalakrishnan Ramamurthy, Cranbury, all of NJ (US)

(73) Assignee: NEC USA, Inc., Princeton, NJ (US)

( * ) Notice: Subject to any disclaimer, the term of this patent is extended or adjusted under 35 U.S.C. 154(b) by 0 days.

(21) Appl. No.: 08/924,820

(22) Filed: Sep. 5, 1997

(51) Int. Cl.⁷ .................................................. H04L 12/28
(52) U.S. Cl. ........................................ 370/412; 370/468
(58) Field of Search .................................. 370/229, 232, 370/235, 395, 399, 412, 415, 416, 417, 418, 468, 236, 230

(56) References Cited

U.S. PATENT DOCUMENTS

| | | | |
|---|---|---|---|
| 5,115,429 A | * 5/1992 | Hluchyj et al. | 370/231 |
| 5,274,644 A | 12/1993 | Berger et al. | |
| 5,392,280 A | * 2/1995 | Zheng | 370/60 |
| 5,521,916 A | 5/1996 | Choudhurry et al. | 370/60.1 |
| 5,701,291 A | * 12/1997 | Roberts | 370/232 |
| 5,734,825 A | * 3/1998 | Lauck et al. | 395/200.13 |
| 5,838,677 A | * 11/1998 | Kozaki et al. | 370/389 |
| 5,909,443 A | * 6/1999 | Fichou et al. | 370/412 |

FOREIGN PATENT DOCUMENTS

| | | | | |
|---|---|---|---|---|
| EP | 0661851 | * 12/1994 | | H04L/12/56 |
| EP | 0680180 | 11/1995 | | |
| EP | 0 705 007 | 4/1996 | | |
| GB | 2272820 | 5/1994 | | |
| JP | 6-97958 | 4/1994 | | |
| JP | 6-338905 | 12/1994 | | |
| JP | 7-183886 | 7/1995 | | |
| WO | WO 95/03657 | 2/1995 | | |

OTHER PUBLICATIONS

Chinatsu Ikeda et al.; "Framework of Traffic Control Schemes for ATOMLAN"; The Institute of Electronics, Information and Communication Engineers vol. 92, No. 511; Mar. 19, 1993; pp. 37–42.

(List continued on next page.)

*Primary Examiner*—Chau Nguyen
*Assistant Examiner*—Alexander O. Boakye
(74) *Attorney, Agent, or Firm*—Sughrue Mion, PLLC

(57) ABSTRACT

A Dynamic Rate Control (DRC) scheduler for scheduling cells for service in a generic Asynchronous Transfer Mode (ATM) switch is disclosed. According to the inventive DRC, each traffic stream associated with an internal switch queue is rate-shaped according to a rate which consists of a minimum guaranteed rate and a dynamic component computed based on congestion information within the switch. While achieving high utilization, DRC guarantees a minimum throughput for each stream and fairly distributes unused bandwidth. The distribution of unused bandwidth in DRC can be assigned flexibly, i.e., the unused bandwidth need not be shared in proportion to the minimum throughput guarantees, as in weighted fair share schedulers. Moreover, an effective closed-loop QoS control can be built into DRC by dynamically updating a set of weights based on observed QoS. Another salient feature of DRC is its ability to control congestion internal congestion at bottleneck points within a multistage switch. DRC can also be extended beyond the local switch in a hop-by-hop fashion.

15 Claims, 6 Drawing Sheets

OTHER PUBLICATIONS

A. Demers, et al., "Analysis and Simulation of a Fair Queueing Algorithm," 1989, pp. 1–12.

L. Zhang, "VirtualClock: A New Traffic Control Algorithm for Packet–Switched Networks," ACM Transactions on Computer Systems, vol. 9, No. 2, May 1991, pp. 102–124.

M. Katevenis, et al. "Weighted Round–Robin Cell Multiplexing in a General–Purpose ATM Switch Chip," IEEE Journal on Selected Areas in Communications, vol. 9, No. 8, Oct. 1991, pp. 1265–1279.

A. Parekh, et al., "A Generalized Processor Sharing Approach to Flow Control in Integrated Services Networks: The Single–Node Case," IEEE/ACM Transactions on Networking, vol. 1, No. 3, Jun. 1993, pp. 344–357.

L. Benmohamed, et al., "Feedback Control of Congestion in Packet Switching Networks: The Case of a Single Congested Node," IEEE/ACM Transactions on Networking, vol. 1, No. 6, Dec. 1993, pp. 693–708.

S. Golestani, "A Self–Clocked Fair Queueing Scheme for Broadband Applications," 1994 IEEE, pp. 636–646.

A. Kolarov, et al, "A Control Theoretic Approach to the Design of a Closed Loop Rate Based Flow Control for High Speed ATM Networks," 1997 IEEE.

S. Jamin, et al., "A Measurement–based Admission Control Algorithm for Integrated Services Packet Networks (Extended Version)".

G. Ramamurthy, et al., "Multi–class Connection Admission Control Policy for High Speed ATM Switches".

J. Bennett, et al., "$WF^2Q$: Worst–case Fair Weighted Fair Queueing".

* cited by examiner

DYNAMIC RATE CONTROL SCHEDULER FOR ATM NETWORKS

This Application relates to U.S. application Ser. No. 08/923,978 now U.S. Pat. Nos. 6,324,165 and Ser. No. 09/040,311, which are incorporated herein by reference.

BACKGROUND OF THE INVENTION

1. Field of the Invention

The present invention relates to a control scheduler for an ATM network and, more specifically, to a scheduler which guarantees minimum rate of transmission, while fairly distributes any unused bandwidth.

2. Description of Related Art

High-speed networks based on the Asynchronous Transfer Mode (ATM) are expected to carry services with a wide range of traffic characteristics and quality-of-service (QoS) requirements. For example, in audio transmission a cell is useless to the receiver if it is delayed beyond the specified rate. On the other hand, video transmission is very bursty and, unless shaped at the entry point, may cause temporary congestion and delay other cells. Integrating all services in one network with a uniform transport mechanism can potentially simplify network operation and improve network efficiency. In order to realize these potential benefits, an efficient and fair means of allocating the network resources is essential.

A central problem in allocating the network resources is the manner in which the service to the various users is prioritized. A simple model is to use a First In First Out (FIFO) algorithm. In a simple First-In First-Out (FIFO) scheduler, there is no way of guaranteeing that each stream gets its assigned rate. During some interval of time, a given stream may transmit at a rate higher than its assigned rate $M_i$, and thereby steal bandwidth from other streams which are transmitting at or below their assigned rates. This problem led to the development of various mechanisms for shaping the entry to the network, such as the known leaky bucket algorithm. For example, the output stream for each queue can be peak rate shaped to a predetermined rate $M_p$.

FIG. 1 shows a static rate control (SRC) scheduler with N-stream queues, SQ1, SQ2 . . . SQN, one queue corresponding to each stream. The SRC scheduler serves a queue i at the constant rate $M_i$ and the output cell streams are fed to a common bottleneck queue CQ which is served at a given rate C. Service from the common queue CQ corresponds to cell transmission over a link of capacity C.

Rate-shaping transforms the streams into constant rate streams (assuming all queues are continuously backlogged). Considering the relationship $$\sum_{i=1}^{N} M_i \leq C. \quad (1)$$

(to be developed further below), the bottleneck queue will be stable; in fact, the maximum queue length is N. In fact, strict inequality in (1) will usually hold, implying that the cell delay in the common queue will be small with high probability. Although the service discipline depicted in FIG. 1 is work-conserving with respect to the stream queues, it is non-work-conserving with respect to the common queue, since it is possible that the common queue may go empty even when at least one of the stream queues is non-empty. This scheduler is similar to a circuit-switched system, except for the asynchronous nature of the cell streams.

If the rates, $M_i$, have been computed correctly based on the stream traffic characteristics and QoS requirements, the minimum rate scheduler should succeed in guaranteeing QoS for all of the streams. However, because this scheduler is non-work-conserving with respect to the common queue, bandwidth could be wasted for one of two reasons:

The CAC algorithm was optimistic in its computation of $M_i$. It may be the case that a bandwidth of $M_i+\Delta$ over short intervals of time is required to ensure that QoS is met for stream i.

The traffic stream could include low priority cells, with the cell loss priority (CLP) bit set to one.

In the first case, a stream should be allowed to make use of bandwidth beyond its allocated rate, $M_i$, if the bandwidth is available. In the second case, the QoS guarantee applies only to cells that conform to the negotiated traffic contract, i.e., cells with cell loss priority (CLP) set to zero. However, if bandwidth is available, a stream should be permitted to transmit nonconforming cells, i.e., cells tagged as CLP=1 cells, over and above the allocated minimum rate for CLP=0 cells. If bandwidth is not available, CLP=1 cells should be dropped before CLP=0 cells; i.e., there should be a lower threshold for dropping CLP=1 cells. (As is known in the art, when a source transmits at a rate higher than the negotiated rate, its violating cells are tagged by setting their CLP to 1.)

Clearly, the problem with the minimum rate scheduler, is that streams cannot make use of excess bandwidth even when it is available. In minimum rate scheduling, there is no statistical multiplexing among cells belonging to different streams. (As is known in the art, statistical multiplexing takes into account "economies of scale," i.e., the bandwidth it takes to transmit all the streams together is less than the sum of the individual bandwidths required to transmit each stream.) A simple way to enhance this scheme is to provide means for serving a cell from a non-empty queue whenever bandwidth is available. During a cell time, if the common queue is empty, the scheduler services a cell from one of the non-empty stream queues.

According to another prior art method, the queue selection is done in a round-robin fashion, and the excess bandwidth i s shared equally among the active streams. A disadvantage of such a scheduler is that queues are served without regard to QoS. That is, the bandwidth is alternated sequentially to the queues without regard to the urgency of transmission, i.e., requested minimum rate, of any specific source. Therefore, this method does not lend itself well for serving different classes having different QoS requirements.

Accordingly, there has been considerable interest in packet scheduling algorithms which are intended to provide weighted shares of the bandwidth on a common link to competing traffic streams, so as to enable service of different classes. With slightly more complexity, the excess bandwidth can be shared using Weighted Round-Robin (WRR) Weighted Fair Queuing (WFQ), and Virtual Clock, and their variants, which attempt to approximate the idealized Generalized Processor Sharing (GPS) scheduling, assuming a fluid model of traffic. For WRR, see M. Katevenis, S. Sidiropoulos, and C. Courcoubetis, Weighted Round-Robin Cell Multiplexing in a General-Purpose ATM Switch, IEEE JSAC, Vol 9, pp. 1265–1279, October 1991. For WFQ, see, A. K. Parekh and R. G. Gallager, A generalized Processor Sharing Approach to Flow Control in Integrated Service Networks: The Single-Node Case, IEEE/ACM Trans. on Networking, vol. 1, pp. 344–357, June 1993. For Virtual Clock, see, L. Zhang, Virtual Clock: A New Traffic Control Algorithm for Packet Switching, ACM Trans. on Computer Systems, vol. 9, pp. 101–124, May 1991. In these schedulers, each stream is assigned a weight corresponding to the QoS requested by a user of the stream. Accordingly, over an interval of time in which the number of active streams is fixed, the bandwidth received by an active stream should be roughly proportional to the assigned weight.

By an appropriate assignment of weights, each stream can be provided with a share of the link bandwidth that is proportional to its weight. Hence, each stream receives a minimum bandwidth guarantee. If a stream cannot make use of all of its guaranteed bandwidth, the excess bandwidth is shared among the active streams in proportion to the weights. However, a stream with a larger weight will not only receive a higher bandwidth guarantee, but also receive larger shares of the available bandwidth than streams with smaller weights. Thus, the weight assigned to a connection determines not only its minimum bandwidth guarantee, but also its share of the available unused bandwidth.

In this specification the term "weighted fair share scheduler" is used generally to refer to a general class of work-conserving schedulers which schedule cells so as to give each stream a share of the link bandwidth which is approximately proportional to a pre-assigned weight. A work-conserving scheduler transmits a cell over the link whenever there is at least one cell in queue. Thus, a work-conserving scheduler basically determines the order in which queued cells should be serviced. The operation of such a scheduler is described in the following.

Consider an idealized fluid model for each traffic stream. Let $w_i$ be the weight assigned to stream i. At time t, the Generalized Processor Sharing (GPS) discipline serves stream i at rate:

$$R_i(t) = \frac{w_i}{\sum_{j \in A(t)} w_j} C, \, i \in A(t), \qquad (2)$$

where A(t) is the set of backlogged streams at time t. Thus, each stream always receives a share of the available bandwidth which is proportional to its weight. Because of the discrete nature of cells or packets, a real scheduler can only approximate GPS scheduling. PGPS (Packet-by packet Generalized Processor Sharing), also known as Weighted Fair Queuing (WFQ) noted above, and its variants (cf. S. J. Golestani, A Self-Clocked Fair Queuing Scheme for Broadband Applications, in IEEE INFOCOM '94, Toronto, June 1994; and J. C. R. Bennett and H. Zhang, WF2Q: Worst-Case Fair Weighted Fair Queuing, in IEEE INFOCOM '96, San Francisco, pp. 120–128, March 1996) are schedulers which approximate GPS for packet scheduling. Other examples of scheduling schemes which attempt to achieve fair sharing are the Virtual Clock and Weighted Round-Robin noted above. Several other weighted fair share schedulers have been proposed in the literature.

It should be appreciated that the assigned weight and the current usage of the network would determine whether a QoS requested by an incoming call can be guaranteed. Therefore, various Connection Admission Control (CAC) algorithms have been developed which decline service when the QoS cannot be guaranteed. For that matter, the CAC algorithm must be able to predict the load on the system, including the newly received call if admitted. Therefore, delay bounds have been found for WRR, WFQ, Virtual Clock and other fair share packet scheduling algorithms. Using these delay bounds, admission control schemes can be devised to provide worst-case delay guarantees. The delay bounds are typically obtained by assuming worst-case behavior for streams controlled by leaky bucket-type open-loop flow control mechanisms. However, a problem in such an algorithm is that the calculated bounds tend to be rather loose, since worst-case deterministic assumptions are made in obtaining the bounds.

Another problem with the prior art schedulers is as follows. Conventionally, schedulers have been designed so that they are work-conserving with respect to the stream queues, in the sense that whenever link bandwidth is available and a packet is in the queue, a packet will be transmitted over the link. In other words, if a packet is available for transmission and there is sufficient bandwidth, the packet will be transmitted and the scheduler will not idle. The work-conserving approach has been promoted in the prior art since it presumably results in the highest possible utilization over the link.

However, within a switching system or the network, there may be several bottlenecks. For example, some of the streams may be bottlenecked at a downstream link at another stage within the switch or the network. In this case, providing these streams more bandwidth than their minimum guaranteed rates (when bandwidth is available) could exacerbate the congestion at the downstream bottleneck. Such congestion cannot be alleviated by the prior art schedulers because they are work-conserving with respect to a single bottleneck, servicing cells only in accordance with the available bandwidth at this bottleneck. That is, conventional weighted fair share schedulers always ensure that excess bandwidth is utilized and that the share of excess bandwidth made available to each queue is proportional to its weight, but they do no exercise control on the absolute value of the rate received at a bottleneck point.

Additionally, if there is a downstream bottleneck, typically backpressure signals which throttle upstream traffic are used to alleviate congestion. However, backpressure signals are susceptible to on/off oscillations, resulting in higher cell delay variation (CDV) and, more significantly, loss of throughput due to the equalization of bandwidth distribution. That is, in the prior art when a buffer reaches its limit, a backpressure signal is sent to the source. Upon receiving the signal the source would stop transmission until the buffer signals that the pressure was relieved. However, at that time it is likely that all the sources would start transmission again concurrently, thereby overloading the buffer again so that the backpressure signal is again generated. Therefore, the system may oscillate for sometime causing large variation in cell delay. Additionally, since all the sources would stop and start transmission at the same time, the throughput would be equalized irrespective of the QoS requested by each source.

Since weighted fair share schedulers schedule cells only with respect to a single bottleneck, throughput for a cell stream may suffer because of backpressure resulting from downstream congestion. Hence, it may not be possible to guarantee a minimum throughput in this case. Consequently, while the prior art weighted share scheduler is work-conserving with respect to a bottleneck link, it may be non-work-conserving with respect to a downstream bottleneck. Thus, the present inventors have determined that work-conservation is not always a desirable property and may lead to further congestion downstream.

Yet another problem with the prior art weighted fair scheduling is that they necessitate an algorithm for searching and sorting out the timestamps applied to the cells in order to determine the next queue to service. More specifically, in the prior art the time stamps are relative, i.e., the scheduler needs to continuously order the cells according to their timestamp. For example, the scheduler may order the cells according to the length of the timestamp or according to the time remaining before the cell would be discarded. Such calculations may slow down the scheduler.

As is known in the art, the ATM Forum has established four main classes of traffic, generally divided into real time traffic and non-real time traffic. Constant Bit Rate (CBR) and Variable Bit Rate (VBR) are used for real time traffic, e.g., audio and video. Available Bit Rate (ABR) and Unspecified Bit Rate (UBR) are non-real time traffic, and are mainly used for computer communication. As can be appreciated, ABR traffic has no minimum rate requirement and the main goal in scheduling ABR cells is to "pump" as many cells as possible using the available bit rate.

a dual proportional-derivative (PD) controller for ABR service has been proposed in A Kolarov and G. Ramamurthy, Design of a Closed Loop Feed Back Control for ABR Service, in Proc. IEEE INFOCOM '97, Kobe Japan, April 1997. The scheduler is implemented on a network-wide basis using resource management (RM) cells. Generally, the source generates RMCEs which propagate through the network. As each RMC cell passes through a switch, it is updated to indicate the supportable rate, i.e., the rate the source should transmit the data (generally called explicit rate). These RMC cells are fed back to the source so that the source may adjust its transmission rate accordingly. However, the propagation of the RMCs through the network causes a large delay in controlling the source. While such delay is acceptable for scheduling ABR cells, it is unacceptable for scheduling real time trafic. Moreover, the delay need to be accounted for by the scheduler, which complicates the computations and slows down the scheduler.

SUMMARY OF THE INVENTION

The present invention provides a new scheduling scheme which uses statistical approaches to admission control so as to provide much higher utilizations, while maintaining the guaranteed QoS. The general concept of the present invention is do construct the rate from two components: (1) a minimum guaranteed rate, and (2) a portion of the unused bandwidth. Constructing the rate from two components allows the scheduler to operate under at least three modes: (1) full available rate (i.e., minimum guaranteed rate plus a portion of the unused bandwidth), (2) minimum guaranteed rate, and (3) halt transmission (with very small probability). In its preferred form, inventive scheduling scheme decouples the minimum guaranteed rate from the portion of unused bandwidth and is called Dynamic Rate Control (DC).

The DRC first distributes the bandwidth so as to support the guaranteed QoS, i.e., it supports the minimum guaranteed rate. Then, the DRC distributes any unused bandwidth to users, based upon a criteria which, in the preferred embodiment, is independent of the minimum rate guaranteed to the users. A notable feature of the inventive DRC is that it is not necessarily work conserving, but rather takes into account bottlenecks downstream in determining whether to allocate unused bandwidth.

As noted above, a disadvantage of the prior art weighted fair sharing is that the entire bandwidth is allocated according to the assigned weight. However, it might be desirable to determine the service rate according to:

$$R_i(t) = M_i + \frac{w_i^f}{\sum_{j \in A(t)} w_j^f} E(t), \quad (10)$$

where, in general, $w_j^f \neq w_j$. In Eq. (10), the minimum rate guarantee and the excess bandwidth for a stream are decoupled. This decoupling allows the network provider to distribute the unused bandwidth independently of the minimum guaranteed rates. The inventive DRC scheduler naturally decouples the minimum rate guarantee from the excess bandwidth allocated to a stream. weights can be assigned on a per-class basis by the CAC or dynamically via a closed-loop QoS control mechanism.

Thus, for example, for UBR it may be preferable to assign very small or even zero guaranteed minimum rate, but to provide a large portion of the available bandwidth. This will help satisfy many real-time calls, while providing service for non-real time UBR when there is bandwidth available.

Also noted above is that since work-conserving schedulers transmit a cell whenever there is at least one cell in a queue, it only determines the order in which queued cells should be serviced. By contrast, a non-work-conserving scheduler may allow a cell time on the link to go idle even if there are cells in queue. Hence, in addition to the ordering of cells for service, timing is also important in non-work-conserving schedulers. Therefore, the present inventors have developed mechanisms to account for both ordering and timing of cell transmission. However, unlike the prior art, in the present invention the timestamp are absolute, rather than relative. That is, at any given current time, CT, any cell having a timestamp which equals the current time is eligible for service. Therefore, there is no need for constant ordering of the cells according to timestamps.

DETAILED DESCRIPTION OF THE PREFERRED EMBODIMENTS

Figure 1:
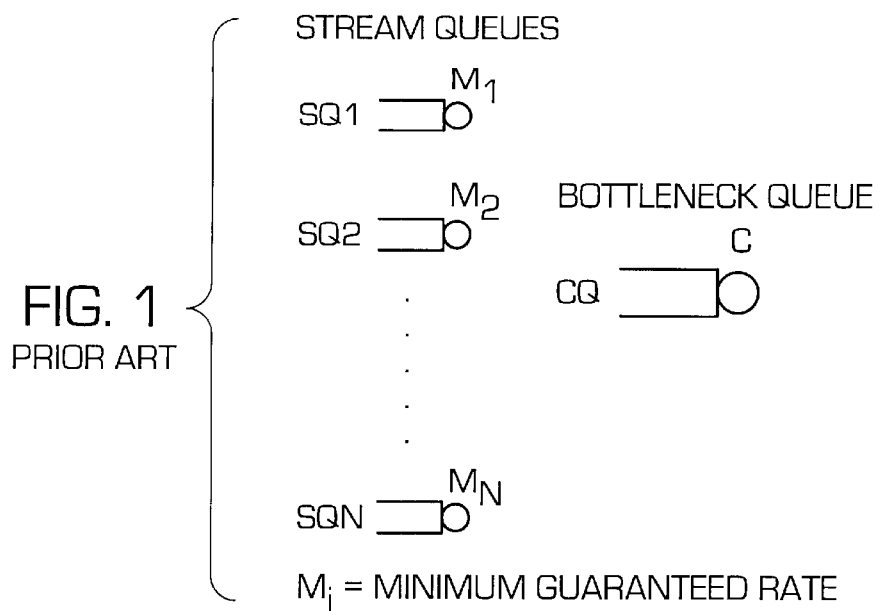
FIG. 1 is a schematic illustrating a static rate control scheduler according to the prior art.

A general aspect of the present invention is the provision of a rate which includes two components: a minimum guaranteed rate and a share of the excess bandwidth. This allows the scheduler to provide service according to various QoS requirements and to shape the rates while accounting for downstream bottlenecks.

Unlike GPS-type schedulers, which distribute the entire bandwidth according to assigned weights, the inventive scheduler first services the minimum rate and then may or may not distribute the unused bandwidth. In its simpler version, this approach can be derived as follows.

A fair share scheduler provides stream i with a minimum bandwidth guarantee, which is a function of the entire available bandwidth, i.e., $$M_i = \frac{w_i}{\sum_{j=1}^{N} w_j} C. \tag{3}$$

Clearly, $$\sum_{i=1}^{N} M_i = C. \tag{4}$$

However, it is preferable to separate the rate into two components: the share of the bandwidth as provided by the minimum rate, plus the share of the unused bandwidth. When A(t) is the set of active streams, the two components rate can be written as:
where $$R_i(t) = \frac{w_i}{\sum_{j=1}^{N} w_j} C + w_i \frac{\sum_{j \notin A(t)} w_j}{\sum_{j=1}^{N} w_j \sum_{j \in A(t)} w_j} C$$

$$= w_i \frac{C}{\sum_{j=1}^{N} w_j} + \frac{w_i}{\sum_{j \in A(t)} w_j} E(t) \tag{5}$$

$$= M_i + \frac{w_i}{\sum_{j \in A(t)} w_j} E(t), \; i \in A(t) \tag{6}$$

$$E(t) = \frac{\sum_{j \notin A(t)} w_j}{\sum_{j=1}^{N} w_j} C, \tag{7}$$

$$= \sum_{j \notin A(t)} M_j \tag{8}$$

$$= C - \sum_{j \in A} M_j, \tag{9}$$

is the excess bandwidth available at time t. Referring to Eq. (6), we see that the rate at which stream i is served is the sum of the minimum guaranteed rate $M_i$ and a weighted fraction of the unused bandwidth E(t). Thus, depending on the load on downstream buffers, the scheduler may or may not use the second component, i.e., may or may not distribute the unused bandwidth. However, it may always continue to provide the guaranteed minimum rate.

While the above scheduler is capable of guaranteeing minimum rate and shaping the rate using the excess bandwidth, it lacks flexibility insofar as the distribution of the excess bandwidth is closely correlated to the assigned weights. From Eq. (5), it is clear that the rate at which stream i is served at time t is the weight $w_i$ multiplied by the sum of the link capacity normalized by the sum of the weights over all streams, and the unused bandwidth normalized by the sum of the weights over all active streams. Hence, both the minimum guaranteed rate $M_i$ and the excess rate $E_i(t)$ are proportional to $w_i$. This is not necessarily desirable from the network provider's point of view. The network provider may prefer to distribute the unused bandwidth in a different proportion than that of the minimum guaranteed rates $M_i$.

Therefore, unless otherwise noted, the remaining description refers to the preferred embodiment of the present invention wherein a novel dynamic rate control (DRC) is provided which ensures the guaranteed QoS and distributes unused bandwidth in an efficient manner decoupled from the minimum guaranteed rate. The inventive DRC is not necessarily work conserving, but rather takes into account bottlenecks downstream in determining whether to allocate unused bandwidth.

In the case of a single bottleneck link shared by a set of traffic streams, the inventive DRC provides a minimum rate guarantee for each stream. Streams which do not make full use of their minimum rate guarantees (i.e., streams with input rates less than their minimum rate guarantees) contribute to a pool of excess bandwidth which is made available to streams which transmit in excess of their minimum rates. In DRC scheduling, the distribution of the excess bandwidth is determined by weights assigned to the streams. In contrast with weighted fair share schedulers, the share of the excess bandwidth which is made available to a stream in the inventive DRC is decoupled from the minimum rate guarantees; i.e., the share of the unused bandwidth need not be proportional to the assigned minimum rate guarantees.

The DRC scheme also strives to provide the minimum rate guarantee on a short time-scale. That is, the DRC scheduler paces the cells of each stream queue such that the spacing between cells belonging to the same stream is no smaller than the reciprocal of the minimum rate. If the connection admission control determines a certain minimum bandwidth requirement for a stream to meet a given QoS, the DRC scheduler should be able to deliver the required QoS by virtue Of its ability to guarantee this minimum rate. Moreover, the DRC scheduler distributes unused bandwidth in a fair manner among the competing traffic streams.

When there are multiple bottlenecks in a switch, the DRC scheme can eliminate congestion at all potential bottlenecks for a given traffic stream. In contrast to the prior art weighted share schedulers, the inventive DRC can provide minimum rate guarantees even in the presence of multiple bottlenecks along a path within the switch. When there are multiple bottlenecks, the share of unused bandwidth given to a stream at a given bottleneck may also depend on the state of the downstream bottlenecks. In this case, rate feedback from each bottleneck encountered by a stream is used to choose the maximum rate at which a virtual channel (VC) can send without causing congestion. Furthermore, DRC can be extended beyond the switch in a hop-by-hop flow control scheme which can provide end-to-end QoS guarantees. (As is known in the art, the term virtual channel refers to a link of communication which is established and maintained for the duration of each cell. The link is called virtual channel since, unlike synchronous transmission, there is no set channel designated to a particular caller.)

In the inventive DRC scheme, the excess bandwidth is shared amongst competing users via the computation of dynamic rates in a closed-loop feedback loop. DRC scheduling also requires the internal transmission of control information within the switch. Notably, the DRC scheme lends itself to a relatively simple rate-shaping scheduler implementation. Unlike fair share schedulers based on timestamps, no searching or sorting is required to find the smallest timestamp.

The main features of the DRC scheduler are outlined below:

1. Provides minimum rate guarantees for each stream.
2. Allows flexible distribution of excess bandwidth. The share of excess bandwidth can be determined by;

(a) Static weights according to traffic class (or other criteria) set by the connection admission control (CAC). Each class weight may be multiplied by the number of active virtual channels (VCs) belonging to the given class to achieve fairness with respect to VCs.

(b) Dynamic weights determined according to observed quality-of-service (QoS) by a dynamic closed-loop control mechanism.

3. Provides internal switch congestion control. This is advantageous especially for providing minimum rate guarantees without overflow of buffers.

4. Allows extensibility to provide minimum rate guarantees on an end-to-end basis via hop-by-hop flow control.

Dynamic Rate Control Principle

This section describes the principles behind the inventive dynamic rate control scheduling. Consider a set of N ATM cell streams multiplexed onto a link of capacity C. Each stream may correspond to a single virtual connection (VC), or a group of VCs belonging to the same traffic class, i.e., a group of VCs requiring the same QoS. Associated with each stream is a queue which stores cells waiting for service, i.e., cells waiting to be transmitted over the link. The function of a scheduler is to determine when the queued cells are to be serviced.

As noted above, the inventive DRC ensures the guaranteed QoS. In the preferred embodiment of the inventive DRC scheduling, the QoS guarantees are mapped onto minimum rate guarantees; however, it should be understood that other mappings may be used. That is, according to the preferred embodiment, the traffic characteristics (obtained from some combination of traffic descriptors and traffic measurement) and QoS requirements for stream i are mapped onto a rate, $M_i$, which is to be provided by the DRC scheduler. If the mapping is done correctly, guaranteeing the rate $M_i$ is then tantamount to providing the QoS guarantee. It is therefore imperative for the scheduler according to the preferred embodiment to be able to guarantee the minimum rate $M_i$ for each stream.

For the purposes of this discussion, it is useful to think of stream i as a group of VCs belonging to the same traffic class, with the same QoS requirements. An embodiment of a per VC queuing will be discussed in a later section. For a given traffic stream i, the bandwidth $M_i$, required to meet cell loss and delay requirements can be computed based on the traffic parameters of the individual VCs and the buffer size. The multiclass connection admission control (CAC) scheme developed in G. Ramamurthy and Q. Ren, Multi-Class Connection Admission Control Policy for High Speed ATM Switches, in Proc. IEEE INFOCOM '97, Kobe, Japan, April 1997, provides procedures for computing $M_i$ for CBR, VBR, and ABR traffic classes based on the traffic parameters declared by individual VCs. The CAC described in that paper takes into account statistical multiplexing gain when there are many VCs belonging to a stream and can further be made more aggressive in its allocations by incorporating traffic measurements at the switch. Given the rate Mi for each stream, the most important requirement of a scheduler is to ensure that each stream receives service at rate $M_i$. For stability of the system, clearly we must have the equation 1 noted above hold true, i.e., the sum of all the individual rates must be less or equal to the rate of the common queue.

In developing the theory behind the inventive Dynamic Rate Control (DRC) scheme, an idealized fluid model for the scheduler is assumed. The stream queues are simultaneously served at the dynamic rates $R_i$ as fluid flows. The input streams to the stream queues consist of discrete cells. Each cell brings a batch of work to the stream queue at which it arrives. The actual implementation of the DRC scheme according to the preferred embodiment is an approximation to the idealized model.

Continuous—time Model

Let A(t) be the set of active streams at time t. A stream is considered active, if its corresponding stream queue is backlogged. The most general form of the dynamic rate associated with stream i is given by $$R_i(t)=M_i+\phi_i(t)E(t), \tag{11}$$

where $M_i$ is a minimum guaranteed rate, E(t) is the excess rate available to all streams at the common bottleneck, and $\phi_i(t) \in [0,1]$ is a normalized weighing factor. That is, the dynamic rate comprises two components: the guaranteed minimum rate, $M_i$, and a part of the unused bandwidth, E(t), determine according to the weighing factor, $\phi_i(t)$, assigned to that stream.

Define $$E_i(t)=\phi_i(t)E(t), \tag{12}$$

as the variable component of the DRC rate for stream i. The excess rate is defined by:

$$E(t) = C - \sum_{j \in A(t)} M_j. \tag{13}$$

wherein C is the rate of the common queue and $M_j$ is the actual transmission rate of stream j of the set A(t) of active streams at time t. The weights $\phi_i(t)$, $i \in A(t)$ reflect how the excess bandwidth is to be allocated among the streams and are normalized such that $$\sum_{i \in A(t)} \phi_i(t) = 1. \tag{14}$$

The weights $\phi_i(t)$ are normalized versions of positive weights $w_i(t)$, $i \in A(t)$, i.e., $$\phi_i(t) = \begin{cases} \dfrac{w_i(t)}{\sum_{i \in A(t)} w_i(t)}, & i \in A(t) \\ 0 & \text{otherwise} \end{cases} \tag{15}$$

Eqs. (11) and (13) define an idealized DRC scheduling scheme for the fluid model. The basic concept of the DRC scheme is illustrated in FIG. 2.

Figure 2:
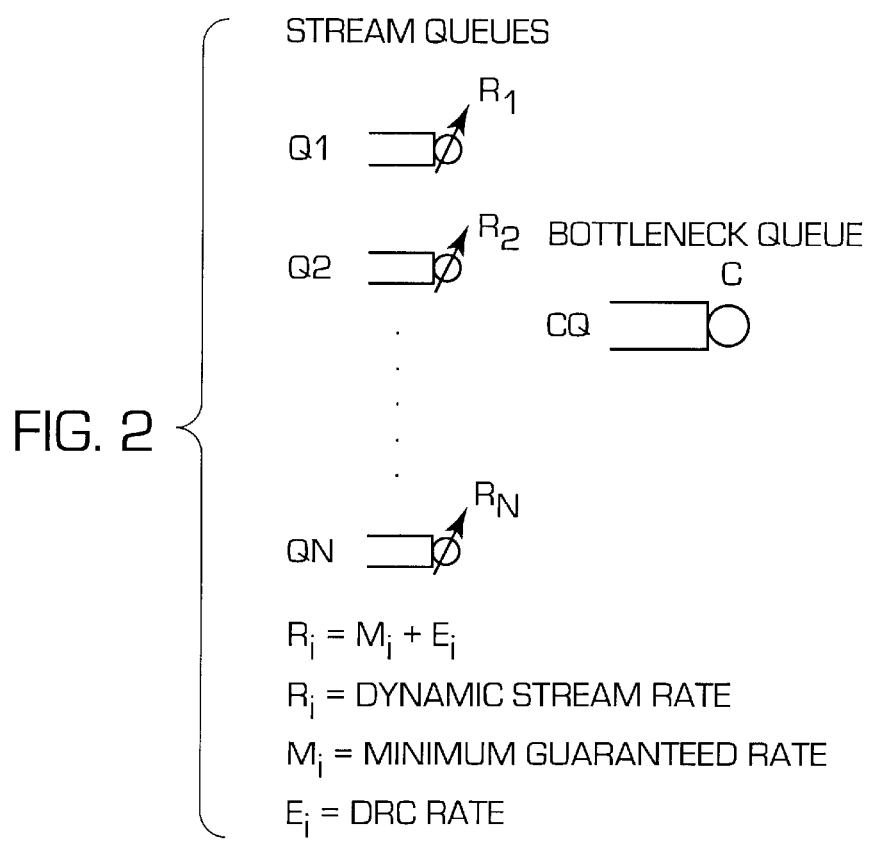
FIG. 2 is a schematic illustrating the dynamic rate control according to the present invention.

As shown in FIG. 2, each stream i has a queue, Q1–QN, each of which being served at a dynamically variable rate R1–RN. Each dynamic rate Ri is made of the guaranteed minimum rate Mi and a share of the unused bandwidth Ei, termed the DRC rate. The flow from all the queues is fed to the common queue CQ, which is served at a rate C.

In practice, it is very difficult to track the set function A(t), since it can change with high frequency. Hence, it is impractical to compute the unused bandwidth via Eq. (13). If the set of traffic streams is reasonably large and the contribution from an individual stream is small relative to the aggregate stream, the statistical multiplexing gain will be high. Under these conditions, the rate at which E(t) changes by a significant amount should be much slower than the rate at which A(t) changes. This suggests that it is more feasible to track E(t) directly, than to track A(t) and then compute E(t) via Eq. (13). In DRC, E(t) is estimated using a feedback control loop to be discussed more fully below.

Discrete—time Flow Model

It is instructive to consider a discrete-time model, where time is partitioned into intervals of length $\Delta$. Assume that stream i arrives to its associated stream queue as a constant fluid flow of rate $X_i(n)$ in the time interval $T_n=(n\Delta, (n+1)\Delta)$. In this time interval, stream queue i is served at the constant rate $R_i(n)=M_i+w_iE(n)$, where $w_i$ is a fixed weight assigned to stream i. The output flow rate, $F_i(n)$, from queue i during the interval $T_n$ is then given by $$F_i(n) = \min(R_i(n), X_i(n)) \tag{16}$$

That is, if the queue is backlogged, the rate would be $R_i(n)$; otherwise it would be the arrival rate $X_i(n)$. The aggregate flow rate to the bottleneck queue during $T_n$ is then $$F(n) = \sum_{i=1}^{N} F_i(n). \tag{17}$$

The excess bandwidth, E(n), over the interval $T_n$ is the sum of a static, unallocated portion of the bandwidth, and a dynamic part of the bandwidth that is currently not used by streams which transmit at less than their minimum guaranteed rates:

$$E(n) = \left(C - \sum_{i=1}^{N}\right) + \sum_{i=1}^{N} [M_i - X_i(n)]^+, \tag{18}$$

where $x^+ \triangleq \max(x,0)$. Again, since it is difficult to obtain knowledge of the input flow rates $X_i(n)$, the present inventors developed an indirect means of computing E(n) via a control loop.

Closed—loop Control

The excess bandwidth E can be estimated via a feedback control loop. By adjusting the value of E, the aggregate flow rate to the bottleneck queue, denoted by F, can be controlled such that:

1. The length of the bottleneck queue is close to a target value $Q_0$; or
2. The average utilization at the bottleneck queue is close to a target utilization value $U_0 < 1$.

Two control algorithms are disclosed herein for estimating E based, respectively, on matching a target queue length and a target utilization. Also disclosed herein is a hybrid control algorithm which combines the merits of the first two.

Matching a Target Utilization

Consider the continuous-time model of the scheduler. Let F(t) denote the aggregate flow rate into the bottleneck queue at time t. We wish to control F(t) to achieve a target utilization $U_0 \in (0,1)$.

The following proportional control law can be used:

$$\dot{F}(t) = \alpha_0(F(t) - U_0 C). \tag{19}$$

That is, the rate of change of the aggregate flow rate is proportioned to the aggregate flow rate less than product of the target utilization and the rate of the common queue.

The control system is stable for $\alpha_0 > 0$ converges with exponential decay rate $\alpha_0$. In terms of the input streams, the aggregate flow rate can be expressed as:

$$F(t) = \sum_{i \in A(t)} R_i \tag{20}$$

$$= \sum_{i \in A(t)} M_i + E(t) \tag{21}$$

Taking derivatives on both sides (wherever F(t) is differentiable), we have $$\dot{F}(t) = \dot{E}(t). \tag{22}$$

Hence, the control law (10) can be re-written as:

$$\dot{E}(t) = \alpha_0 [F(t) - U_0 C]. \tag{23}$$

The control law Eq. (23) is the basis for a method for estimating E(t) in the discrete-time model. The discrete-time form of Eq. (23), is as follows:

$$E(n+1) = E(n) - \alpha_0 \epsilon(n), \tag{24}$$

where we define the error signal as $\epsilon(n) = F(n) - U_0 C$. Since the excess bandwidth must lie in the interval [0,C], the control law takes the form:

$$E(n+1) = I_{[0,C]}(E(n) - \alpha_0 \epsilon(n)), \tag{25}$$

where $I_{[0,C]}(x) = 1$ if (x) equals or larger than zero, but equal or less than C; otherwise, $I_{[0,C]}(x) = 0$. Over an interval in which the input fluid stream flows are constant, the recursion in Eq. (25) will converge to the correct value for the excess bandwidth E. The speed of convergence depends on the values of the coefficient $\alpha_0$ and the sampling interval $\Delta$.

Figure 3:
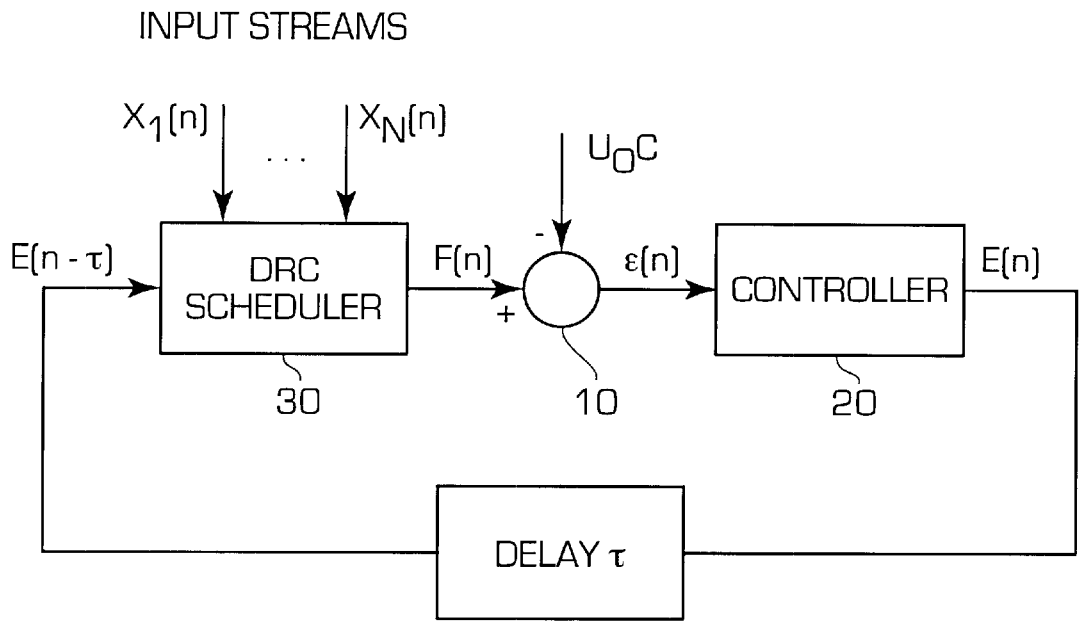
FIG. 3 is a block diagram depicting an embodiment of an inventive controller based on matching target utilization.

FIG. 3 shows a block diagram of the controller based on matching the target utilization $U_0$. The error is calculated by adder 10 and is provided to the controller 20. The controller 20 outputs the current excess bandwidth E(n) which is fed back to the DRC scheduler 30. In practice, there is a delay in the feedback loop between the controller and the scheduler. However, within a switch, this delay $\tau$ is typically negligible relative to the sampling interval $\Delta$ and can be ignored. The DRC scheduler allocates the excess bandwidth E(n) to the input streams $(X_1(n)-X_n(n))$ according to the DRC scheduler disclosed above, which results in a—aggregate flow rate F(n).

Matching Queue Length

Let Q(t) be the length of the bottleneck queue at time t and let $Q_0$ be a target queue length value. Assuming a fluid model of traffic, the queue length grows according to the aggregate rate less the common queue rate:

$$\dot{Q}(t) = F(t) - C. \tag{26}$$

The proportional control law, $$\dot{F}(t) = -\alpha'_0(Q(t) - Q_0), \tag{27}$$

leads to the equation $$\ddot{Q}(t) + \alpha'_0 Q(t) = \alpha'_0. \tag{28}$$

(See, e.g., L. Benmohamed and S. Meerkov, Feedback Control of Congestion in Packet Switching Networks: The Case of a Single Congested Node, IEEE/ACM Trans. on Networking, vol. 1, pp. 693–708, December 1993.) The characteristic equation for (28) has a double root, implying non-decaying, oscillatory behavior of Q(t). This problem can be resolved by adding a derivative term to (27), resulting in the proportional-derivative (PD) controller $$F(t) = -\alpha'_0(Q(t) - Q_0) - \alpha'_1 \dot{Q}(t) \tag{29}$$

The corresponding differential equation governing the behavior of Q(t) is:

$$\ddot{Q}(t) + \alpha'_1 \dot{Q}(t) + \alpha'_0 Q(t) = \alpha'_0 Q_0, \tag{30}$$

which is stable if $\alpha'_0, \alpha'_1 > 0$. The convergence rate can be assigned arbitrarily by appropriate choices for $\alpha'_0$ and $\alpha'_1$. From (29) and (21), the unused bandwidth can be obtained as:

$$E(t) = -\alpha'_0(Q(t) - Q_0) - \alpha'_1 \dot{Q}(t), \tag{31}$$

Then a discrete-time controller can be obtained from (31) as $$E(n+1) = I_{[0,C]}(E(n) - \alpha'_0 \epsilon(n) - \alpha'_1 \epsilon(n-1)) \tag{32}$$

where $\epsilon(n) = Q(n) - Q_0$ is the error signal sampled at time n. Here, Q(n) is the queue length sampled at time $t = n\Delta$. This controller attempts to keep the queue length near $Q_0$, maintaining the utilization at 100%.

Figure 4:
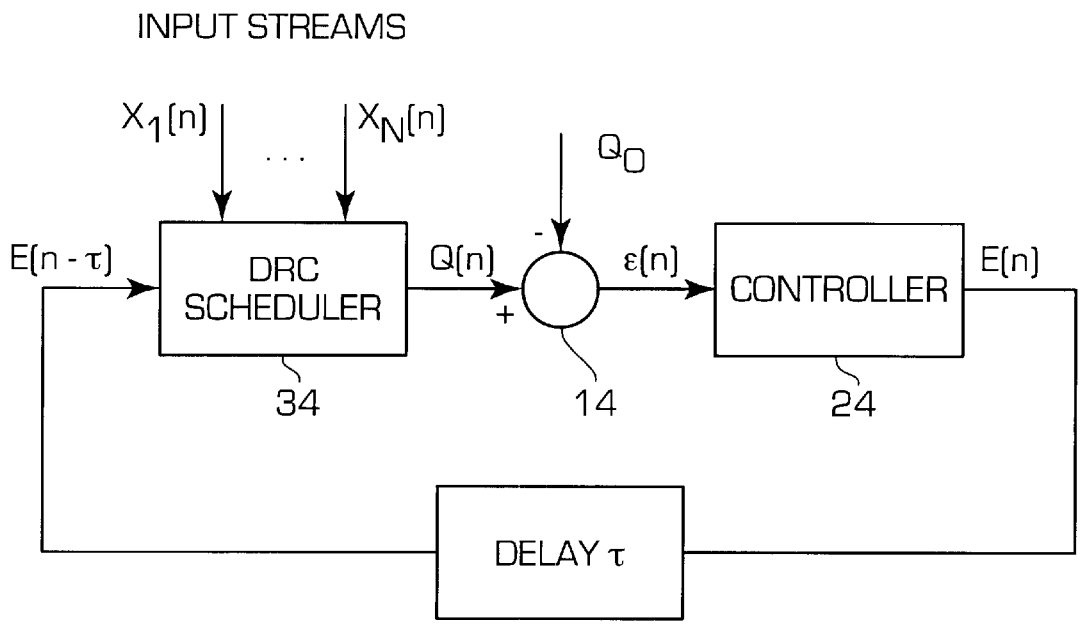
FIG. 4 is a block diagram depicting an embodiment of an inventive controller based on matching target queue length.

FIG. 4 shows a block diagram of the controller. The target queue length $Q_o$ is subtracted from the queue length at time n, Q(n), by the adder 14, to provide the error E(n) to the controller 24. The controller 24 outputs the unused bandwidth E(n) to be feedback to the DRC controller. Again a delay τ may be introduced, but may be ignored when the DRC is uses within the switch. The DRC controller then allocates the available bandwidth to generate an aggregate flow rate F(n).

Hybrid Control

Clearly the disadvantage of matching the flow rate to a target utilization, $U_0$, is that bandwidth is lost since $U_0$ must be less than one. However, if queue length information is not readily available, the control algorithm based on flow rate measurement is a viable alternative. The control algorithm based on queue length information achieves 100% utilization. A disadvantage of this algorithm, however, is that when the utilization is less than 100% the system is not controlled. If the utilization is less than 100%, the queue length is zero; hence, E(n) reaches the maximum value C. Now if the aggregate traffic flow increases to a rate close to C, the queue may grow to a large value before the controller can bring the queue length to the target value $Q_0$.

If both flow rate and queue length information are available, the merits of both controller algorithms may be combined in a hybrid controller as follows:

if $F(n) < U_0 C$ then $$E(n+1) = E(n) - \alpha_0(F(n) - U_0 C)$$

else $$E(n+1) = E(n) - \alpha'_0(Q(n) - Q_0) - \alpha'_1(Q(n-1) - Q_0)$$

end if

We remark that the coefficients $\alpha_0, \alpha_1$, will be different for each of the two controllers. Thus, when the utilization is less than $U_0 < 1$, the utilization-based controller attempts to match the target utilization. When the utilization exceeds $U_0$, the hybrid controller switches to the queue-based controller. This results in a more controlled queue growth as the aggregate traffic flow increases.

As can be seen, while the underlying principle of the hybrid controller is somewhat similar to the dual proportional-derivative (PD) controller proposed in the Kolarov and Ramamurthy paper cited above, the present invention enables use of the PD controller for real time traffic. This is made possible, among others, by implementing the PD controller on a switch, rather than a network-wide basis. Consequently, the delay of the RMCs becomes negligible so that RMCs can be used to control real time traffic. Additionally, the practical elimination of the delay allows simplification of the calculation and speed-up of the controller.

Overload Control

The hybrid closed-loop controller adjusts the unused bandwidth E(n) to reduce the magnitude of an error signal $$\epsilon(n) = \begin{cases} F(n) - U_0 C & \text{if } F(n) < U_0 C \\ Q(n) - U_0 & \text{otherwise} \end{cases} \tag{33}$$

However, the dynamics of the aggregate stream may be faster than that of the closed-loop controller. The queue length, Q(n), may still grow to a large value before the closed-loop controller can bring it close to the target value $Q_0$. The queue growth is caused by streams which transmit at rates larger than their minimum guaranteed rates. This may result in buffer overflow in the second stage queue and/or unacceptable delays for streams which are transmitting at close to their minimum rates. Depending on the value of Δ, the response time of the closed-loop controller may be too slow to prevent buffer overload in the second stage queue.

Figure 5:
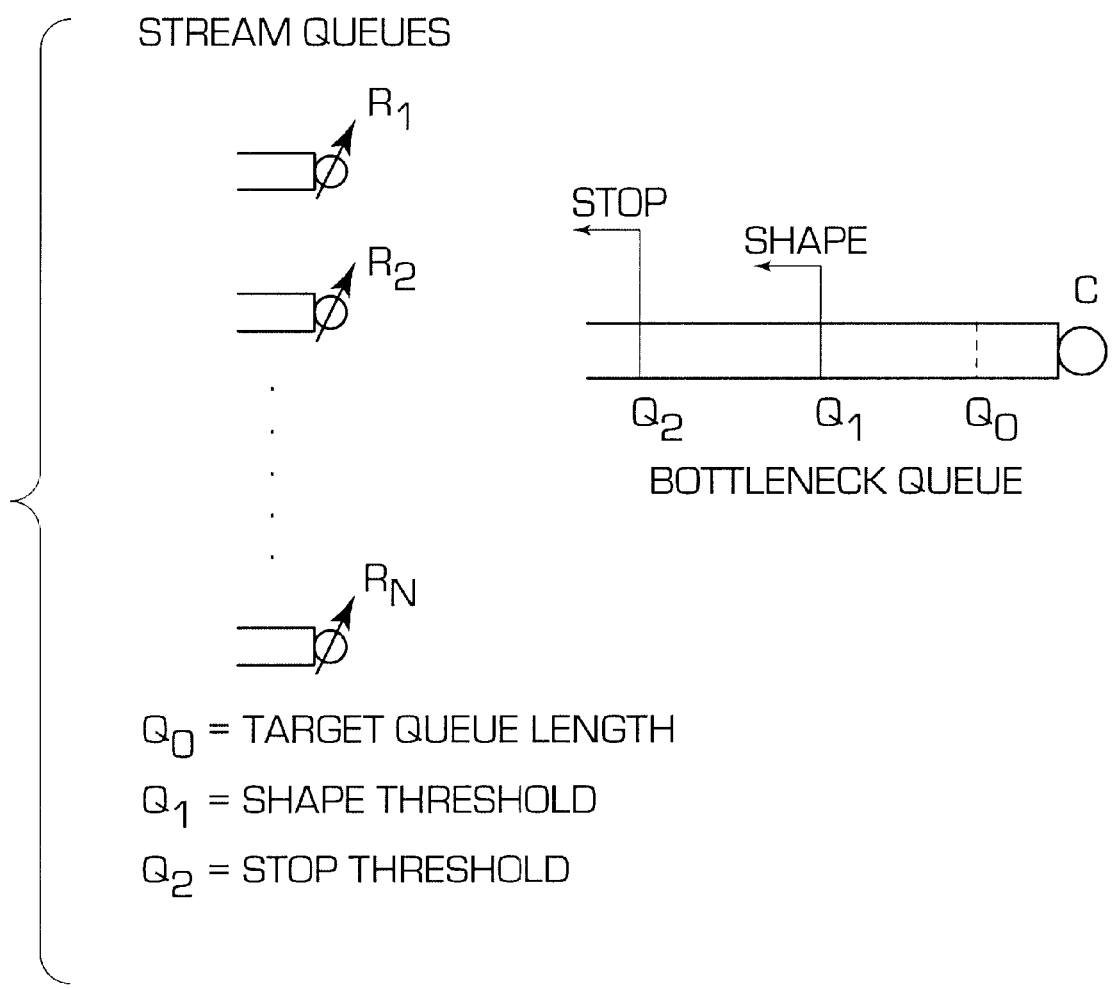
FIG. 5 is a schematic illustrating the inventive DRC scheduling with overload control.

Therefore, in the preferred embodiment an overload control mechanism is employed which reacts quickly to control congestion. DRC scheduling with overload control is illustrated in FIG. 5. When the bottleneck queue length exceeds the shape threshold $Q_1 > Q_0$, a shape signal is transmitted to the DRC scheduler. The DRC scheduler responds by shaping all streams to their minimum rates. This is equivalent to driving the unused bandwidth signal, E(n), to zero. The time for the shape signal to propagate to the DRC scheduler and take effect should be much smaller than the DRC sampling interval Δ. When the queue level falls below $Q_1$, the DRC controller reverts back to the hybrid controller.

To prevent buffer overflow in the second stage queue, a stop signal can be used. When the second stage queue length exceeds a stop threshold $Q_2 > Q_1$, a stop signal is transmitted to the DRC scheduler. In this case, the DRC scheduler completely throttles all traffic streams until the queue length falls below $Q_2$. This control mechanism imposes a maximum length for the second stage queue. In practice, the stop signal should be activated with low probability. This will be the case if the thresholds $Q_1$ and $Q_2$ are chosen correctly. With the shape and stop overload control signals, the scheduling rate for each stream at the nth sampling interval can be expressed as:

$$R_i(n) = [M_i + I_{\{Q < Q1\}}(Q(n) \cdot w_i E(n)] I_{\{Q < Q2\}}((Q(n)), \tag{25}$$

where Ix(x) denotes the indicator function on the set X. Wherein $I_{\{Q<Q1\}}(Q(n))=1$ if Q(n)<Q1, and $I_{\{Q<Q1\}}(Q(n))=0$ otherwise. Similarly, $I_{\{Q<Q2\}}(Q(n))=1$ if Q(n)<Q2, and $I_{\{Q<Q2\}}(Q(n))=0$ otherwise.

Multiple Bottlenecks

One notable application for the inventive DRC is in a multi stage ATM switch, such as that exemplified in the related U.S. application Ser. No. 08/923,978 now U.S. Pat. No. 6,324,165. In a multi-stage ATM switch, there are multiple bottleneck points. A stream may pass through several stages before reaching an output line of the switch. In the DRC approach, the streams are rate-controlled at the input stage to control congestion within the switch itself, as opposed to controlling flow in the network. Therefore, the bulk of the cell buffering occurs at the input stage of the switch.

Consider an individual stream which passes through B bottlenecks. At the jth bottleneck, a DRC rate $E^{(j)}(n)$ is computed at the nth sampling interval. Define the overall bottleneck excess rate as:

$$E^*(n) = \min E^{(j)}(n). \tag{35}$$

Let $Q_1^{(j)}$ and $Q_2^{(j)}$ denote, respectively, the shape and stop thresholds at the jth bottleneck. Define the vectors:

$$Q_i = [Q_i^{(j)} : 1 \leq j \leq B], \quad i=1,2. \tag{36}$$

Denote the queue length at the jth bottleneck at time n by $Q^{(j)}(n)$ and define the vector:

$$Q(n) = [Q^{(j)}(n) : 1 \leq j \leq B], \tag{37}$$

Then, in analogy to Eq. (34), the dynamic rate for stream i for the multiple bottleneck case is computed as:

$$R_i(n) = [M_i + I_{\{Q < Q1\}}(Q(n) \cdot w_i E^*(n)] \cdot I_{\{Q < Q2\}}((Q(n)), \tag{38}$$

Figure 6:
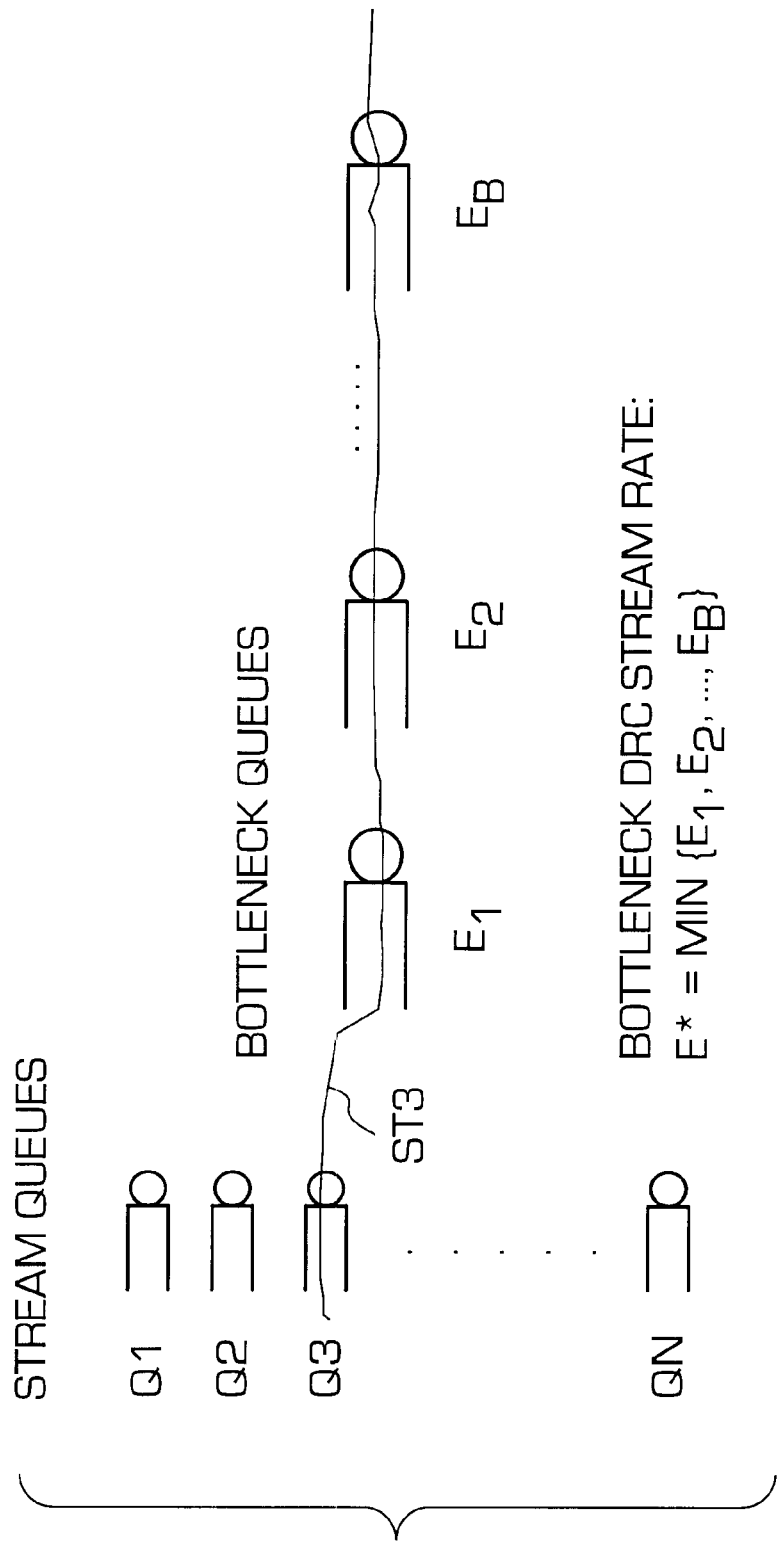
FIG. 6 is a schematic illustrating the inventive DRC scheduling with multiple bottlenecks.

FIG. 6 shows a set of stream queues, Q1–QN, along with a set of bottleneck queues. At the ith bottleneck queue, a DRC rate, $E_i$, is estimated based on flow and queue length information. For a given stream, e.g. ST3, the overall DRC rate is the minimum of the bottleneck rates for bottlenecks traversed by the stream. From the perspective of the given stream queue, congestion in downstream bottlenecks are controlled and the queuing of cells is pushed upstream when congestion arises at one or more bottlenecks. Ultimately, the congestion is pushed back to the stream queue, where most of the queuing takes place for the stream.

Rate—shaping Scheduler

In order to implement DRC, a mechanism for rate-shaping a number of streams is necessary. Two implementations of a scheduler which shapes a set of streams according to DRC rates are disclosed herein. The first is appropriate when the number of streams is relatively small (on the order of a hundred or less), for example, when cells are queued according to class. The second implementation can handle a large number of streams (on the order of tens of thousands), but is slightly more complex.

Scheduling for Rate—shaping

DRC scheduling is implemented using timestamps. A timestamp, TS, is associated with each queue. A stream is active if and only if its corresponding queue is non-empty. Otherwise, the stream is inactive. The DRC scheduler schedules only active streams for service. When a stream is served, the first cell in the associated queue is transmitted to the second stage queue and the status of the stream is updated.

Two distinct timestamp computation formulas, are provided depending on whether a queue is to be scheduled or rescheduled. The timestamp computations ensure that each stream is shaped to the appropriate rate, as determined by the DRC scheme.

Scheduling

A given queue is scheduled when the queue is empty and a new cell arrives to the queue, i.e., when the associated stream changes from the inactive to the active state. The basic formula for computing the new timestamp for scheduling queue i is given as follows:

$$TS_i = \max\{CT, TS_i + 1/R_i(n)\}, \tag{39}$$

where CT is the current time, $CT \in (n\Delta, (n+1)\Delta]$, and $R_i(n)$ is the dynamic rate for queue i at time n.

Rescheduling

A given queue is rescheduled after an active stream has been served and the stream remains active, i.e., its associated queue remains non-empty. In this case, the timestamp computation for rescheduling queue i is:

$$TS_i = TS_i + 1/R_i(n). \tag{40}$$

Catching—up with current time

Queue i is said to be ready at current time CT if $TS_i \leq CT$. This means that the queue can be served while conforming to its assigned dynamic rate $R_i$. In a practical implementation of DRC scheduling, it is possible that the sum of the dynamic streams may exceed the link capacity, i.e., $$\sum_{i \in A(t)} R_i(n) > C. \tag{41}$$

If this condition persists, the set of ready queues may increase and the timestamps of some ready queues may fall behind the current time, CT, by large values.

To correct this situation, a mechanism is provided whereby a queue is scheduled at its minimum guaranteed rate if its associated timestamp falls behind current time by a designated amount. In particular, if the queue timestamp falls behind current time by more than the reciprocal of the minimum guaranteed rate at the time of scheduling/rescheduling, the queue is scheduled/rescheduled at the minimum guaranteed rate. Scheduling a queue at its minimum guaranteed rate allows its timestamp to 'catch up' with the current time clock, by slowing down the rate at which the queue is being scheduled. With the 'catch up' provision, the scheduling and rescheduling procedures are as follows:

Scheduling if $TS_i < CT - 1/M_i$ then $TS_i = \max\{CT, TS_i + 1/M_i\}$ else $TS_i = \max\{CT, TS_i + 1/R_i(n)\}$ end if

Rescheduling if $TS_i < CT - 1/M_i$ then $TS_i = TS_i + 1/M_i$ else $$TS_i = TS_i + 1/R_i(n)$$

end if

Serving Ready Queues

Serving a ready queue consists of transmitting the first cell in the queue to the bottleneck queue and, if necessary, rescheduling the queue for service. It is possible that several queues may become ready at the same time. In practice, it is not possible to serve all ready queues during one cell time. Thus, a collection of ready queues can form.

The ready queues can in turn be scheduled for service by means of a work-conserving scheduler. For example, ready queues could simply be served in round-robin fashion. Alternatively, a weighted fair share scheduler could be used to ensure fair short time-scale bandwidth share among the ready queues. However, the improved bandwidth share does not warrant the considerable additional complexity required to implement weighted fair share scheduling.

The preferred embodiment implements a round-robin with four priority levels, listed below in decreasing order of priority:

1. Dynamic high priority (HP)
2. Real-time, Short CDV (RT-S)
3. Real-time, Long CDV (RT-L)
4. Non-real-time (NRT)

The HP priority is a dynamic assignment. Ready queues which have been scheduled at their minimum guaranteed rates are automatically scheduled as HP. This ensures that all streams receive their minimum rate guarantees on a short time-scale. The remaining three priority levels are assigned statically, according to traffic class and tolerance for cell delay variation (CDV). Streams classified as RT-S are real-time streams which have small CDV tolerances, while RT-L streams have larger CDV tolerances. Non-real-time (NRT) streams generally do not have requirements on CDV.

In general, low bit-rate real-time streams would be classified as RT-L, while high bit-rate realtime streams would be classified as RT-S. However, the CDV tolerance of a stream need not be directly related to its bit-rate. The static priority levels protect streams with small CDV tolerance from the bunching effects of streams with larger CDV tolerances. For example, consider a scenario in which there are one thousand 75 kbps voice streams sharing a 150 Mbps link with a single 75 Mbps multimedia stream. Assuming that the multimedia stream is constant bit rate (CBR), it needs to send a cell once every two cell times. If cells from the voice streams are bunched together (at or near the same timeslot), the multimedia stream will suffer from severe CDV, relative to its inter-cell gap of one cell time. In the worst-case, two cells from the multimedia stream could be separated by up to one thousand voice cells.

Per Class Queuing

In the case of per class queuing, when the number of streams is relatively small, the scheduler can be implemented with a parallel array of comparators. The ith comparator takes as inputs CT and $TS_i$ and evaluates $$f_i = \begin{cases} 1 & CT \geq TS_i \text{ and queue } i \text{ active} \\ 0 & CT < TS_i \end{cases} \quad (42)$$

Queues with $f_i=1$ have had their timestamps expire and hence are ready for service. These queues are served using round-robin with priority based on a priority flag $p_i$ assigned as follows:

$$p_i = \begin{cases} 0 & \text{if queue } i \text{ scheduled at rate } M_i \\ 1 & \text{if queue } i \text{ is } RT-S \\ 2 & \text{if queue } i \text{ is } RT-L \\ 3 & \text{if queue } i \text{ is } NRT \end{cases} \quad (43)$$

Figure 7:
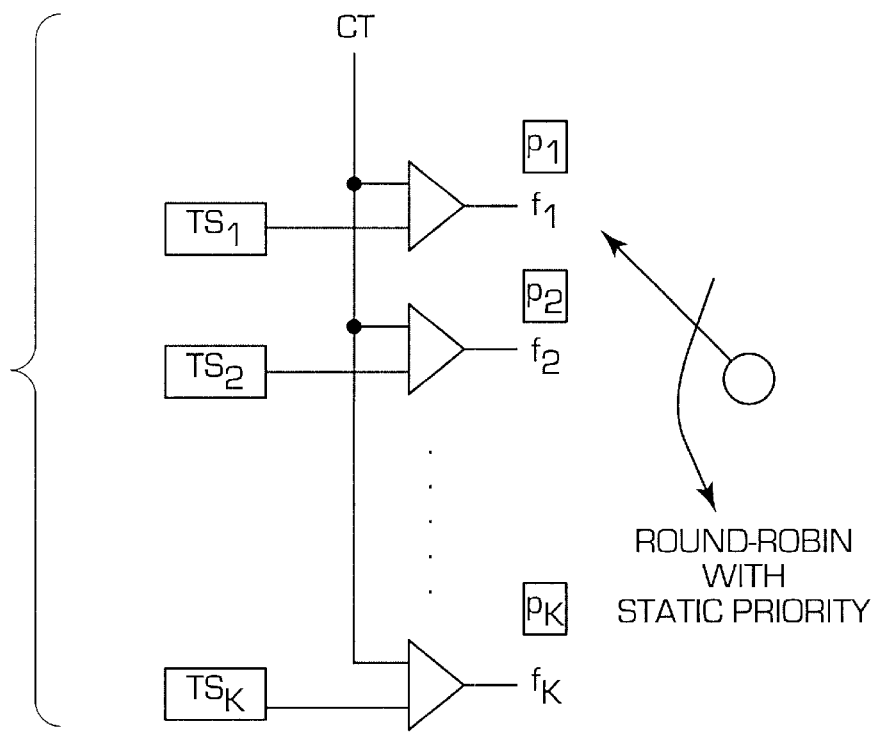
FIG. 7 is a schematic illustrating a rate-shaping scheduler structure for per class queuing.

A logical view of the scheduler is illustrated in FIG. 7. The scheduler performs a round-robin search for a queue $i$ satisfying $f_i=1$ and $p_i=0$. If no such queue exists, the round-robin search continues by searching for queue $i$ satisfying $f_i=1$ and $p_i=1$. The processes continues until either a queue is found, or all priority levels have been searched.

Per VC Queuing

Figure 8:
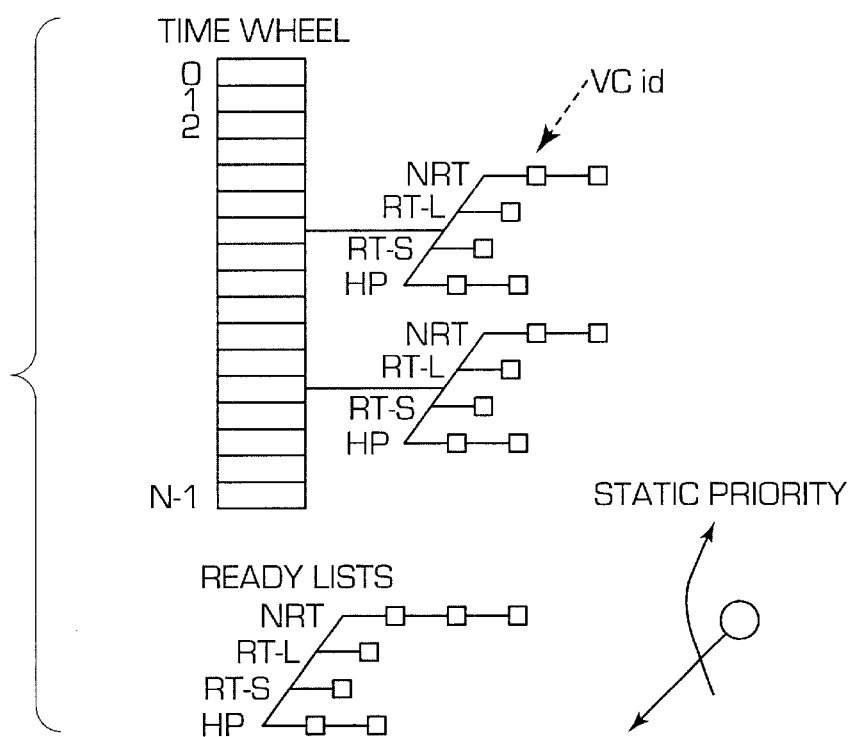
FIG. 8 is a schematic illustrating a rate-shaping scheduler structure for per virtual channel queuing.

In per VC queuing, the number of queues is on the order of tens of thousands. In this case, it is not economical to implement the scheduler using a parallel array of comparators. Instead, a scheduler based on a time wheel data structure is preferable. As shown in FIG. 8, each bin in the time wheel points to a four linked lists (one for each priority level) of VC identifiers whose timestamps correspond to the bin label. During each time slot, the current time CT advances to point to the next bin. The VC identifiers linked to bins which have been passed by CT are all ready for service. For each priority level, a ready list of ready bins is constructed. VCs are then served from the ready list in round-robin fashion, according to priority level.

Providing Multi—class Quality-of-Service

In order to provide quality-of-service (QoS), a connection admission control (CAC) algorithm is necessary to determine whether or not a new VC can be accepted while satisfying the QoS requirement of the new VC and the existing VCs. DRC scheduling simplifies the CAC function by providing a direct mapping between the bandwidth required to provide QoS to a stream and the rate at which the stream is scheduled for service. In particular, the CAC determines a minimum required bandwidth to provide QoS for a traffic stream and this bandwidth is used as the minimum guaranteed rate for the stream under DRC. If the DRC scheduler is able to provide the minimum guaranteed rate, then the QoS for the stream will also be satisfied. In DRC, the method of computing the DRC rate depends on whether cells are queued by class or by VC.

From an analysis point of view, per VC queuing is preferable; however, from an implementation point of view, per VC may not be preferable since it requires a large number of queues. The main advantage of per VC queuing is that each VC is guaranteed a minimum rate. Additionally, in a per VC queuing, all downstream bottlenecks are considered in calculating the rate, thus avoiding overflow of downstream buffers. Also, in a per VC queuing there would be no head-of-line blocking. On the other hand, per class queuing is simpler to implement if only one downstream bottleneck is considered. Notably, such an arrangement requires fewer queues.

First, queues will be described for the case wherein a static weight, $w_i$, is assigned to each class by the CAC. The value of the weight $w_i$, determines the share of the free bandwidth that is allocated to class i. Thereafter, a method wherein the weights are modified dynamically in the context of a closed-loop control, based on observed QoS Will be disclosed.

Per Class Queuing

When cells are queued by class, the traffic stream corresponding to class i is an aggregate of several individual VC streams. The CAC determines a minimum required bandwidth, denoted $M_i$, needed to satisfy the cell loss and cell delay requirements. The CAC provides the DRC scheduler with the minimum guaranteed rate, $M_i$, and also the class weight, $w_i$. The dynamic rate for stream i at a single bottleneck point is computed as $$R_i(n) = M_i + \frac{w_i}{\sum_{j \in A(n)} w_j} E(n), \quad (44)$$

where $w_i$ is the weight assigned to stream i and $A(n)$ is the set of 'active' streams over the time interval $((n-1)\Delta, n\Delta]$. To simplify notation, we shall implicitly assume that all computed rates are multiplied by the indicator function $I_{[0,C]}(x)$ to ensure that the rates fall in the range [0,C]. Methods for estimating the number (or weighted sum) of active streams or VCs, e.g., the sum $$S(n) = \sum_{j \in A(n)} w_j, \quad (45)$$

in Eq. (43) will be discussed further below.

Suppose that we can obtain an estimate for $n_i(n)$, the number of active VC streams composing stream i. By setting $w_i = n_i(n)$, the unused bandwidth can be distributed fairly with respect to the individual VCs. In this case, each VC will receive an equal share of the excess bandwidth E(n). More generally, both a class weight and the number of active VCs can be taken into account in distributing the excess bandwidth. If $\psi_i$ denotes the static class weight, the DRC weights would be assigned as $w_i(n) = \psi_i n_i(n)$ Per VC Queuing In per VC queuing, for N VC there are N VC queues. Each VC queue belongs to one of K classes. Let c(i) denote the class to which VC i belongs and let $C_k$ denote the set of VCs belonging to class k. VC i is assigned a minimum guaranteed rate $M_i$. Class k is assigned a minimum guaranteed bandwidth $M_k$, which is sufficient to guarantee QoS for all VCs in class k. When VC i in class k becomes inactive, the unused bandwidth $M_i$ is first made available to VCs belonging to class c(i), up to the class guaranteed bandwidth $M_k$, and then to the VCs in the other classes.

In the per VC paradigm a dynamic rate is computed for VC i as follows:

$$R_i(n) = M_i + E_{c(i)}(n), \quad (46)$$

where $E_k(n)$ denotes the estimated unused bandwidth for class k at the sampling instant n. We assume that the flow rate at time n, $F_k(n)$, of class k cells into the common queue can be measured. Also, we assume that it is possible to count the number, $Q_k(n)$, of class k cells in the common queue at time n. The common queue length is given by $$Q(n) = \sum_{k=1}^{K} Q_k(n). \quad (47)$$

The excess bandwidth at the bottleneck point, denoted E(n), is estimated as a function of the aggregate flow rate, F(n), and the common queue length, Q(n). It can be computed using the hybrid PD controller discussed earlier:

if $F(n) < U_0 C$ then $$E(n+1) = E(n) - \alpha_0 (F(n) - U_0 C) - \alpha_1 (F(n-1) - U_0 C)$$

else $$E(n+1) = E(n) - \alpha'_0 (Q(n) - Q_0) - \alpha'_1 (Q(n-1) - Q_0)$$

end if

The minimum guaranteed class bandwidth, $M_k$, is determined by the CAC. The dynamic rate for class k is computed as:

$$R_k(n) = M_k + w_k n_k(n) E(n), \quad (48)$$

where $w_k$ is the weight for class k and $n_k(n)$ is an estimate for the number of active VCs belonging to class k.

The dynamic class rate $R_k(n)$ represents the bandwidth available to VCs in class k. For VCs in class k, the unused bandwidth is computed with respect to $R_k(n)$. The unused bandwidth for class k, $E_k(n)$, can be computed using the hybrid PD controller as follows:

if $F_k(n) < U_0^{(k)} R_k(n)$ then $$E_k(n+1) = E_k(n) - \alpha_0(F_k(n) - U_0^{(k)} R_k(n)) - \alpha_1(F_k(n-1) - U_0^{(k)} R_k(n-1))$$

else $$E_k(n+1) = E_k(n) - \alpha'_0 (Q_k(n) - Q_0^{(k)}) - \alpha'_1 (Q_k(n-1) - Q_0^{(k)})$$

end if

Here, $U_0^{(k)}$ and $Q_0^{(k)}$ are, respectively, the target utilization and target queue length for class k.

Thus, the above novel per VC queuing accomplishes a two-tier distribution of the unused bandwidth. A first distribution according to class and a second distribution according to VCs within the class.

In equation (46) it is implied that $E_{c(i)}(n)$ is distributed evenly among the active streams within the class. However, continuing with the DRC theme, one may elect to have variable distribution. This can be easily accomplished by introducing a weight factor, e.g., $\phi_i$, assigned to each VC within the class. Thus, the rate would be computed as:

$$R_i(n) = M_i + \phi_i E_{c(i)}(n).$$

Closed-loop Quality-of-Service Control

In the DRC scheme, the excess bandwidth, E(n), is computed via a feedback control loop. This excess bandwidth is distributed among the streams by means of the weights, $w_i$. In the previous section, the weights were assumed to be static, and chosen by the CAC. However, the most general form of DRC allows the weights to be time-varying (cf. Eq. (2)). In the following, we develop a scheme for providing closed-loop QoS control in conjunction with DRC, whereby the weights are adjusted based on the observed QoS of the streams. For the purposes of this discussion, we will assume per class queuing, although the same methodology applies under per VC queuing as well.

Concept

As discussed in the previous section, a CAC function is necessary to guarantee QoS. However, since the traffic streams are inadequately characterized, the CAC may overestimate or underestimate the amount of bandwidth which should be allocated to a stream in order to guarantee QoS. The only way to determine whether QoS guarantees are being satisfied is to measure, in some way, the QoS experienced by an individual stream. If the measured QoS falls below the target QoS, more bandwidth should be allocated to the stream. Conversely, if the QoS for a stream exceeds the target QoS, it may be possible to take some bandwidth away from the stream and make it available to other streams which are in greater need of the bandwidth.

A dynamic or measurement-based CAC (cf. G. Ramamurthy cited above and S. Jamin, P. Danzig, S. Shenker, and L. Zhang, A Measurement-Based Admission Control Algorithm for Integrated Service Packet Networks, IEEE/ACM Trans. on Networking, vol 9, pp. 56–70, February 1997) adjusts the bandwidth assigned to a stream based on traffic measurements. Measurements take place over a relatively long time interval (e.g., an order of magnitude less than call holding times). Then corrections are made to the CAC bandwidth allocation. For example, it may be possible to obtain reasonable estimate of cell loss probability over a time interval. A further challenge is how to determine how much bandwidth should be added to a connection suffering QoS degradation. The closed-loop QoS control method disclosed in this section operates on a shorter time-scale compared with the dynamic CAC, e.g., on the same order as the dynamic rate computations. The closed-loop control can make short-term corrections to alleviate errors made by the CAC. The closed-loop control can also work well in conjunction with a dynamic CAC.

The basic idea is to assign the weight, $w_i(t)$, proportional to the deviation between the observed QoS at time t and a target QoS measure for stream i. Let $q_i(t)$ be the observed QoS for stream i in the first-stage queue i at time t. For example, $q_i(t)$ could represent a measure of the cell delay experienced at time t. Let $q_i^*$ represent the target QoS for queue i. The normalized deviation of the observed QoS from the target QoS is given by: since the $$\frac{q_i(t) - q_i^*}{q_i^*}. \quad (49)$$

weights should always be positive, we assign them as follows:

$$w_i(t) = \frac{q_i(t)}{q_i^*}. \quad (50)$$

With this assignment of weights, streams which are further away from their QoS targets receive greater shares of the excess bandwidth. Conversely, streams which are meeting or exceeding their QoS targets will receive proportionately smaller shares of the excess bandwidth.

The closed-loop QoS control attempts to minimize the worst-case deviation of a given stream from its target QoS. With the assignment of weights according to Eq. (50), each stream effectively makes a bid for the excess bandwidth based on the ratio of its perceived QoS to its target QoS. In this way, a stream suffering from poor QoS automatically takes more of the available excess bandwidth compared with a stream which is meeting or exceeding its target QoS. Closed-loop QoS can make short-term corrections to errors in bandwidth allocation made by the CAC.

QoS Measurement

In a real implementation, the QoS of a stream must be measured over a time interval. Updates to the weights take place at discrete times. A reasonable scheme is to re-compute the weights directly either before or after the computation of the excess bandwidth. As an example, the average cell delay, D(n), in the first stage queue for a stream can be measured over the time interval (nΔ, (n+1)Δ]. Average queue length is also a relatively simple weighing function which can be used.

On the other hand, it is very difficult to estimate cell loss probability over a relatively short period of time. This QoS metric can only be estimated over a longer time interval. A dynamic CAC might be able to estimate cell loss probability and to allocate sufficient bandwidth to correct the cell loss probability for the next measurement interval, based on observations of the traffic over the current interval.

Congestion Control via Dynamic Rate Control

In this section, we discuss how DRC can be used to control congestion at bottlenecks within a multi-stage switch. We then discuss how DRC can be extended beyond the local switch to provide hop-by-hop congestion control.

Input-Output Buffered Switch

The prior art, weighted fair share schedulers distribute bandwidth weighted with respect to a single bottleneck. Minimum rate guarantees can be provided with respect to this bottleneck. However, if there is a second, downstream bottleneck, the prior art weighted fair share scheduler may not be able to provide bandwidth guarantees. The input streams to the second-stage bottleneck may originate from different bottleneck points in the first stage. If these first stage bottlenecks are scheduled independently by weighted fair share schedulers, congestion at the common second-stage bottleneck may arise, resulting in the loss of rate guarantee.

Figure 9:
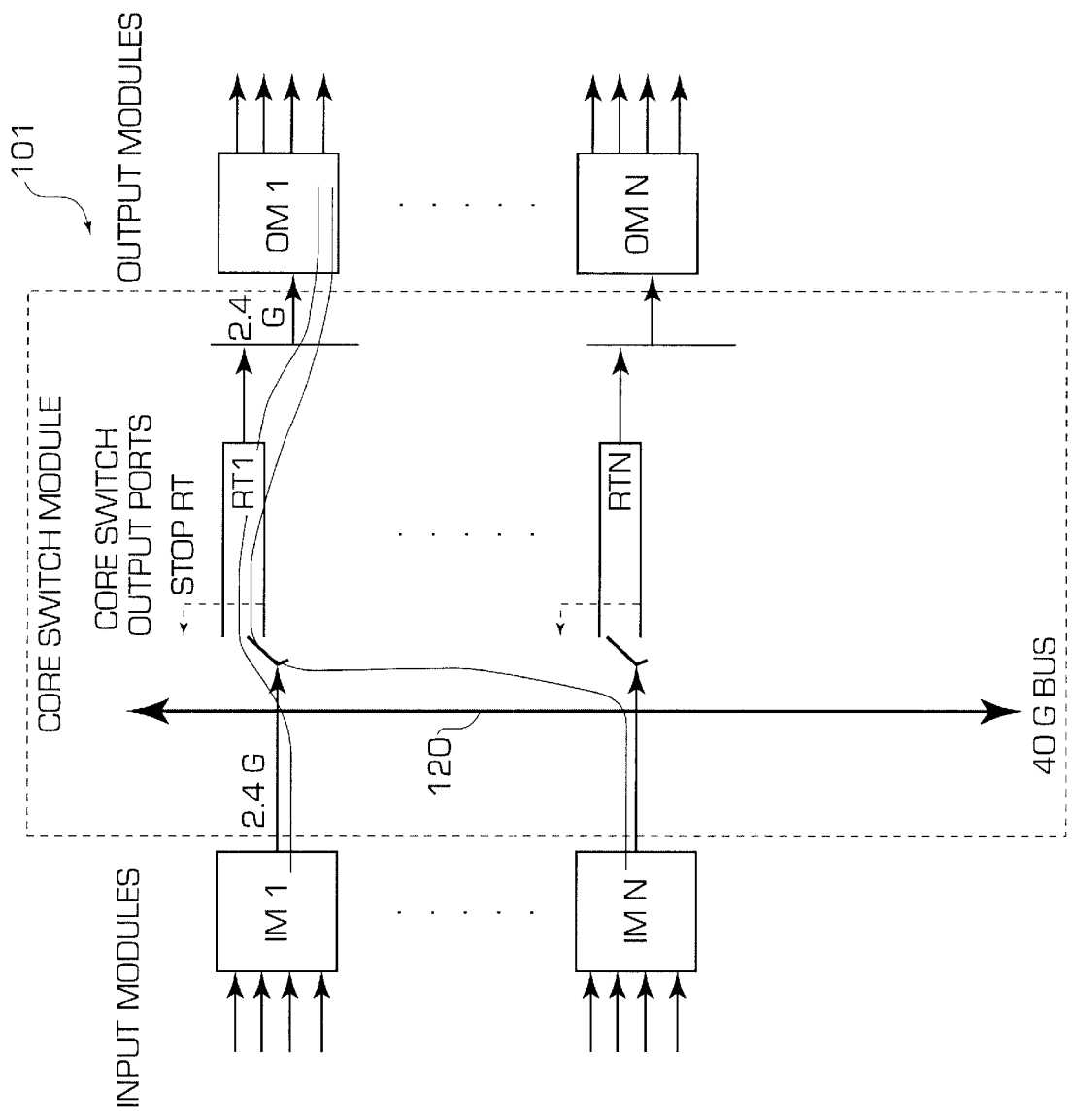
FIG. 9 is a schematic illustrating an input output buffered switch.

FIG. 9 shows an example of a hypothetical N×N input-output buffered switch. Input and output modules, Im1–Imn and Om1–OMN, respectfully, are connected to a core switching element 101 having a central high speed bus 120 (e.g., a time-division multiplexed bus). Each input module has a scheduler which schedules cells to be transmitted over the bus 120. Each output module consists of buffers RT1–RTN which operate at the speed of the bus, i.e., N times the line speed. When the output buffer occupancy reaches a certain threshold, a signal is broadcast to all input modules. The signal causes all input modules to throttle the flow of traffic to the given output module. This prevents buffer overflow at the output module.

Consider two streams, $s_1$ and $s_2$, originating from different input modules and destined to the same output module. Assume that both streams are continuously backlogged and suppose they are scheduled using weighted fair share schedulers. Since the schedulers are work conserving, the output cell rate from each input module will be equal to the line rate C. The output module buffer level will eventually exceed the backpressure threshold. The backpressure signal will throttle both input modules until the buffer occupancy at the output module falls below the stop threshold. The throughput received by each stream will be 0.5C. With weighted fair schedulers, it is not possible to achieve different throughputs for the two streams. This is because the schedulers are work conserving with respect to the first stage bottleneck.

On the other hand, if DRC schedulers are employed at the input modules, the output streams from the input modules can be shaped to different rates. For example, suppose $M_1=0.1C$ and $M_2=0.8C$. Then the excess bandwidth at the output module bottleneck is 0.1C. If this excess bandwidth is distributed evenly between the two streams, the throughputs for the two streams will be $R_1=0.15C$ and $R_2=0.85C$, respectively.

Hop-by-Hop Dynamic Rate Control

Dynamic Rate Control can be extended beyond the local switch if cells are queued per VC. If the downstream switch is able to transmit rate information on a per VC basis, e.g., through resource management (RM) cells. The downstream rate can be used by the local DRC scheduler to schedule VCs as follows:

$$R=\min(R_{local}, R_{downstream}).$$

While the invention has been described with reference to specific embodiments thereof, it will be appreciated by those skilled in the art that numerous variations, modifications, and embodiments are possible, and accordingly, all such variations, modifications, and embodiments are to be regarded as being within the spirit and scope of the invention.

It should be appreciated that while the above disclosure is provided in terms of scheduling cells in an ATM switch, the inventive dynamic rate control (DRC) can be implemented for scheduling data packets in packet switching. For example, equations 39 and 40 can be easily modified to account for the packet's length as follows:

$$TS_i=\max\{CT, TS_i+L/R_i(n)\}, \quad (39')$$

$$TS_i=TS_i+L/R_i(n). \quad (40')$$

wherein L represents the length of the packet at the head of the queue being scheduled.

What is claimed is:

1. A method of rate-based cell scheduling of a plurality of cells arriving at an ATM switch having a plurality of queues, comprising:
    directing each one of said plurality of cells to a respective queue;
    assigning a respective minimum rate guarantee for each of said queues;
    assigning a respective excess rate share for each of said queues;
    estimating excess bandwidth on a downstream link;
    transmitting said cell from said queues according to the respective minimum rate guarantee, while distributing the excess bandwidth to said queues according to said excess rate share.

2. A method of rate-based scheduling at an ATM switch having a plurality of input queues, comprising the steps of:
    assigning a minimum guaranteed rate for each of said queues;
    computing a dynamic rate for each of said queues;
    shaping each stream arriving at each of said queues according to the respective minimum guaranteed rate and the respective dynamic rate.

3. The method of claim 2, wherein said ATM switch further comprises a plurality of output buffers, said method further comprising the steps of:
    monitoring the level of each of said buffers and, when one of said buffers reaches a predetermined level, generating a shape signal identifying said one buffer;
    scheduling said queues according to a rate composed of the minimum guaranteed rate plus the dynamic rate when said shape signal is not generated and scheduling said queues according to said minimum rate when said shape signal is generated.

4. A method of rate-based cell scheduling of a plurality of cell streams, comprising the steps of:
    assigning a minimum rate for each of said plurality of cell streams;
    calculating a dynamic rate for each of said cell streams, said dynamic rate comprising a product of an assigned weight and an estimated excess bandwidth at a downstream bottleneck; and
    adding each dynamic rate to a corresponding minimum rate.

5. The method of claim 4, wherein the excess bandwidth is estimated via a feedback control loop.

6. The method of claim 4 wherein said assigned weight is static.

7. The method of claim 4 wherein said assigned weight is dynamic.

8. A method for queuing a plurality of virtual channels in an ATM switch having a plurality of input buffers, comprising the steps of:
    assigning an input buffer for each of said virtual channels;
    assigning a minimum guaranteed rate for each of said buffers;
    assigning a weight for each of said buffers;
    calculating a dynamic rate for each of said buffers, said dynamic rate comprising the minimum guaranteed rate plus a portion of an unused bandwidth of said switch, said portion being proportional to the assigned weight; and
    shaping transmissions from said buffers according to the dynamic rate.

9. The method of claim 8, wherein each of said buffer is assigned to only one virtual channel.

10. The method of claim 8, wherein each of said buffers is assigned to a plurality of virtual channels having similar quality of service requirements, further comprising the step of:
    distributing the dynamic rate of each buffer to its respective active virtual channels.

11. The method of claim 10, wherein said dynamic rate is distributed evenly among the respective active virtual channels.

12. The method of claim 10, wherein each of said virtual channels is assigned a secondary weight and wherein the dynamic rate is distributed to the respective virtual channels according to the respective secondary weight.

13. A method for controlling overload in a buffer comprising:
    monitoring a load level in said buffer;
    when said load level reaches a first threshold, generating a shape signal to cause input to said buffer to be reduced to a minimum level;

when said load level reaches a second threshold, generating a stop signal to halt any input to said buffer;

estimating an unused bandwidth available on said buffer; and generating a signal indicating said estimate.

14. A method of rate-based scheduling of a plurality of data packets arriving at a switch having a plurality of queues, comprising:

directing each one of said plurality of packets to a respective queue;

assigning a respective minimum rate guarantee for each of said queues;

assigning a respective excess rate share for each of said queues;

estimating excess bandwidth on a downstream link;

transmitting said packet from said queues according to the respective minimum rate guarantee, while distributing the excess bandwidth to said queues according to said excess rate share.

15. A method of rate-based scheduling at a switch having a plurality of input queues, comprising the steps of:

assigning a minimum guaranteed rate for each of said queues;

computing a dynamic rate for each of said queues;

shaping each packet stream arriving at each of said queues according to the respective minimum guaranteed rate and the respective dynamic rate.

* * * * *